United States Patent
Ngo

(10) Patent No.: US 9,733,866 B2
(45) Date of Patent: Aug. 15, 2017

(54) DYNAMIC DRIVE SELECTION FOR MIGRATION OF FILES BASED ON FILE SIZE FOR A DATA STORAGE SYSTEM

(71) Applicant: International Business Machines Corporation, Armonk, NY (US)

(72) Inventor: Khanh V. Ngo, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/608,083

(22) Filed: Jan. 28, 2015

(65) Prior Publication Data

US 2016/0216892 A1    Jul. 28, 2016

(51) Int. Cl.
*G06F 12/00* (2006.01)
*G06F 3/06* (2006.01)

(52) U.S. Cl.
CPC ........... *G06F 3/0659* (2013.01); *G06F 3/061* (2013.01); *G06F 3/0647* (2013.01); *G06F 3/0685* (2013.01); *G06F 3/0686* (2013.01)

(58) Field of Classification Search
CPC ...... G06F 3/061; G06F 3/0647; G06F 3/0659; G06F 3/0685; G06F 3/0686
See application file for complete search history.

(56) References Cited

U.S. PATENT DOCUMENTS

| | | | |
|---|---|---|---|
| 7,864,479 B2 | 1/2011 | Ashton et al. | |
| 8,156,281 B1 | 4/2012 | Grosner et al. | |
| 8,639,665 B2 | 1/2014 | Berman et al. | |
| 8,817,411 B1 | 8/2014 | Sims et al. | |
| 2014/0025683 A1* | 1/2014 | Howland | G06F 17/30598 707/740 |
| 2014/0046917 A1 | 2/2014 | Smith | |
| 2014/0108837 A1 | 4/2014 | Muller | |

FOREIGN PATENT DOCUMENTS

EP    0992913 A1    4/2000

OTHER PUBLICATIONS

Kaczmarski et al., "Beyond Backup Toward Storage Management," IBM Systems Journal, vol. 42, No. 2, 2003, pp. 322-337.
Luminex, "Mainframe Tape Migration Data Sheet," Luminex, Retrieved from http://www.luminex.com/solutions/tape_migration.php, Oct. 15, 2014, 2 pages.
Ngo, K., U.S. Appl. No. 15/583,792, dated May 1, 2017.
Non-Final Office Action from U.S. Appl. No. 15/583,792, dated Jun. 2, 2017.

* cited by examiner

Primary Examiner — Yong Choe
(74) Attorney, Agent, or Firm — Zilka Kotab, P.C.

(57) ABSTRACT

In one embodiment, a method includes determining a size of a file associated with each job in a job queue of files to be migrated to one of a plurality of drives that includes at least one of each of the following: a faster drive and a relatively slower drive. The availability of a faster drive is determined. The file associated with the job in the job queue having a file size larger than a threshold is sent to the faster drive.

16 Claims, 11 Drawing Sheets

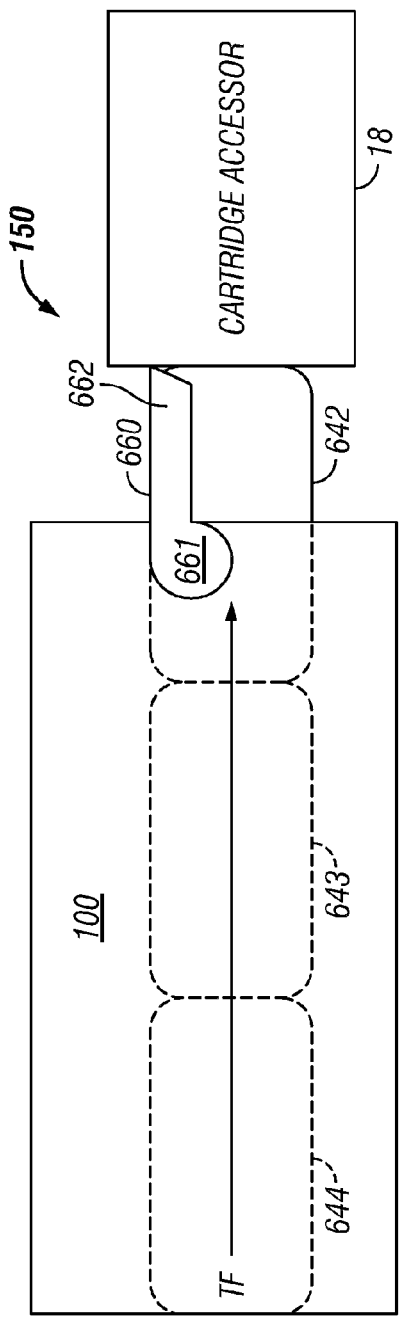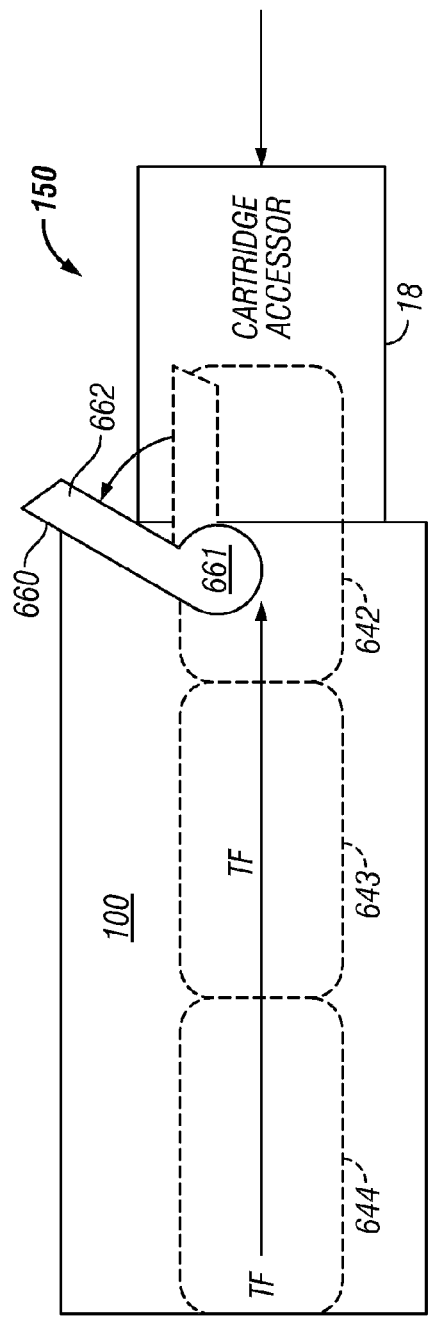
FIG. 8A
FIG. 8B

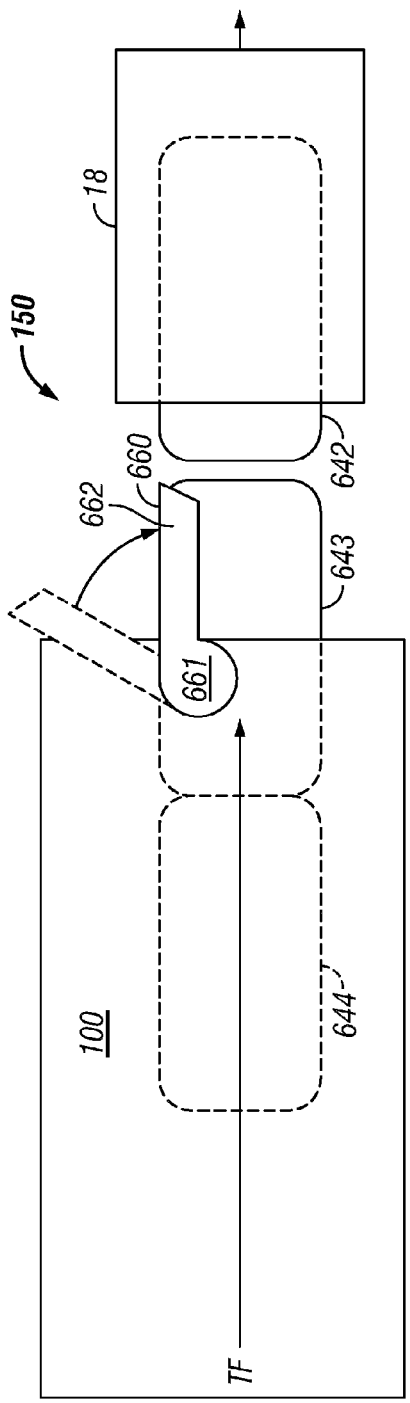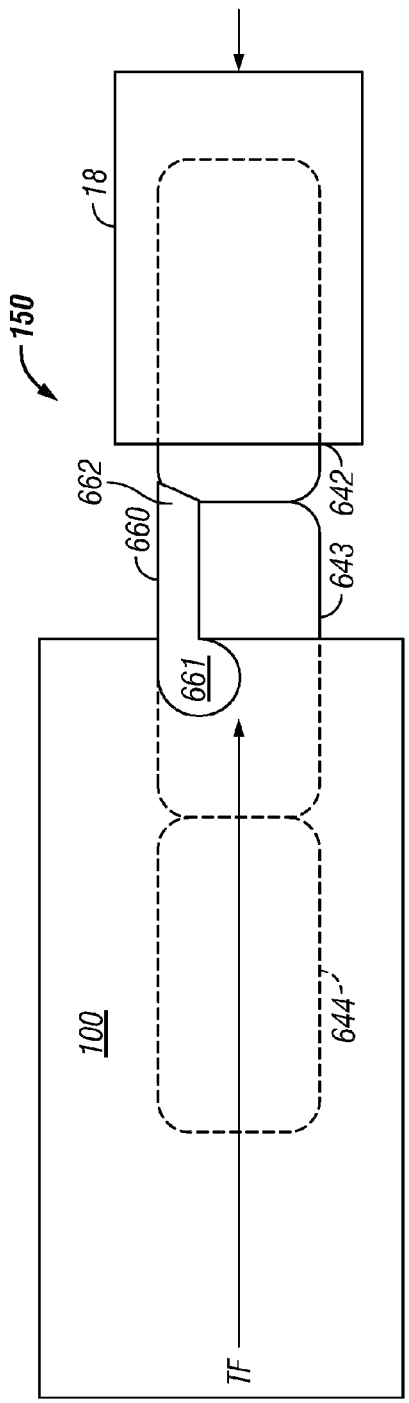
FIG. 8C
FIG. 8D

DYNAMIC DRIVE SELECTION FOR MIGRATION OF FILES BASED ON FILE SIZE FOR A DATA STORAGE SYSTEM

BACKGROUND

The present invention relates to data storage systems, and more particularly, this invention relates to drive selection in a data storage system.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

BRIEF SUMMARY

A method, according to one embodiment, includes determining a size of a file associated with each job in a job queue of files to be migrated to one of a plurality of drives that includes at least one of each of the following: a faster drive and a relatively slower drive. The availability of a faster drive is determined. The file associated with the job in the job queue having a file size larger than a threshold is sent to the faster drive.

A method, according to another embodiment, includes determining a size of a file associated with each job in a job queue of files to be migrated to one of a plurality of drives that includes at least one of each of the following: a faster drive and a relatively slower drive. Availability of the slower drive is determined, and the file associated with the job in the job queue having a file size smaller than a threshold is sent to the slower drive when the slower drive is available.

A computer program product for selecting a drive based on file size, according to one embodiment, includes a computer readable storage medium having program instructions embodied therewith, the program instructions executable by a controller to cause the controller to perform one and/or both of the foregoing methods, and/or variations thereof.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 8A-8D are partial side views of a cartridge blocking mechanism according to one embodiment.

DETAILED DESCRIPTION

Figure 1:
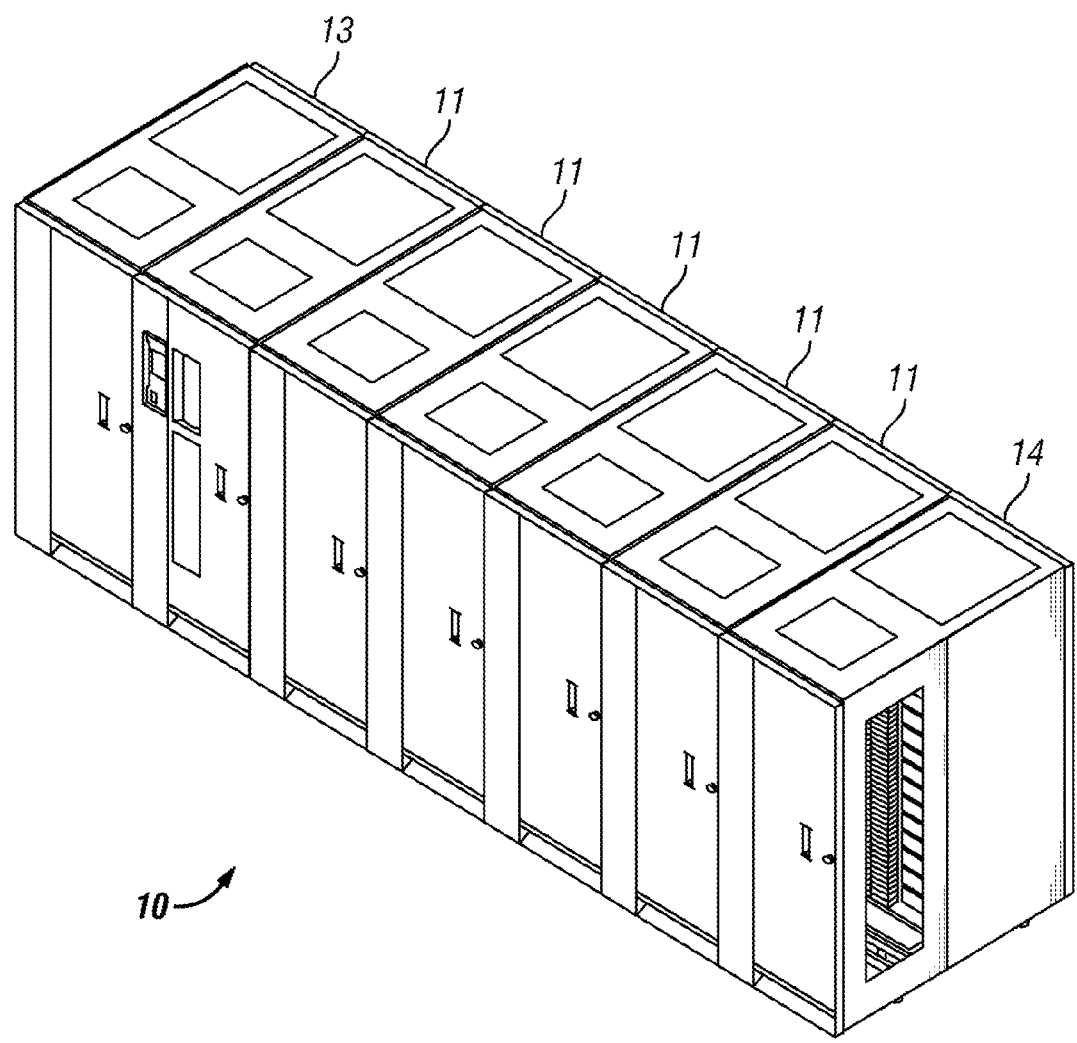
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof. Various embodiments provide the ability to select faster drives to migrate data from large files and select slower drives to migrate data for the small files. Where many different file sizes are present, various embodiments are able to complete the jobs much faster than merely migrating the data to the drives without any dynamic selection.

In one general embodiment, a method includes determining a size of a file associated with each job in a job queue of files to be migrated to one of a plurality of drives that includes at least one of each of the following: a faster drive and a relatively slower drive. The availability of a faster drive is determined. The file associated with the job in the job queue having a file size larger than a threshold is sent to the faster drive.

In another general embodiment, a method includes determining a size of a file associated with each job in a job queue of files to be migrated to one of a plurality of drives that includes at least one of each of the following: a faster drive and a relatively slower drive. Availability of the slower drive is determined, and the file associated with the job in the job queue having a file size smaller than a threshold is sent to the slower drive when the slower drive is available.

In another general embodiment, a computer program product for selecting a drive based on file size includes a computer readable storage medium having program instructions embodied therewith, the program instructions executable by a controller to cause the controller to determine, by the controller, a size of a file associated with each job in a job queue, and determine, by the controller, availability of a faster drive. Program instructions are also provided to cause the controller to send, by the controller, a file associated with a job in the job queue associated with a file having a file size larger than a threshold to the faster drive; determine, by the controller, availability of a relatively slower drive; send, by the controller, a file associated with a job in the job queue having a file size smaller than the threshold to a slower drive; and send, by the controller, the file associated with the second job to the slower drive when the slower drive is available.

Figure 2:
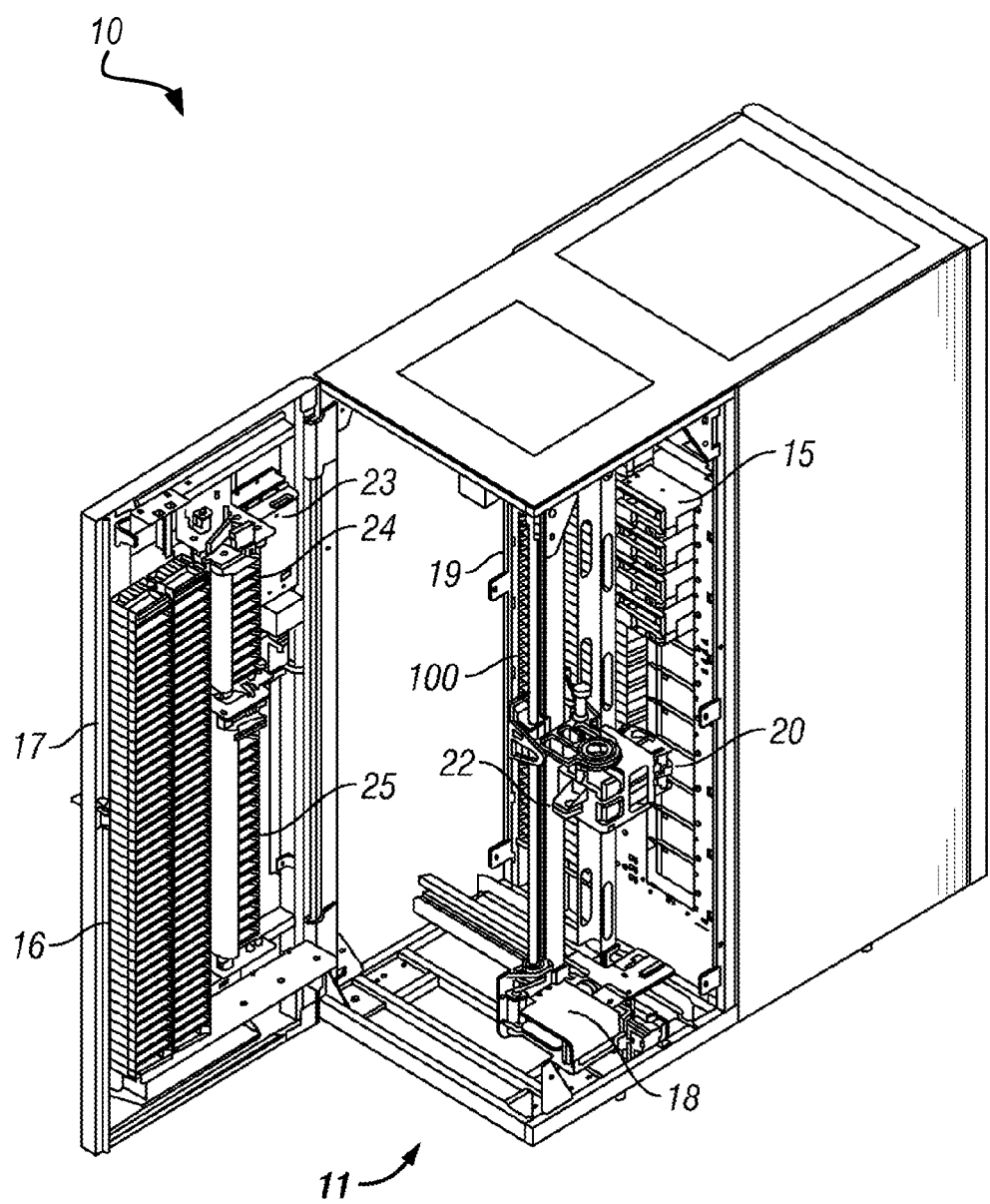
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used to storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel 23 or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

Figure 3:
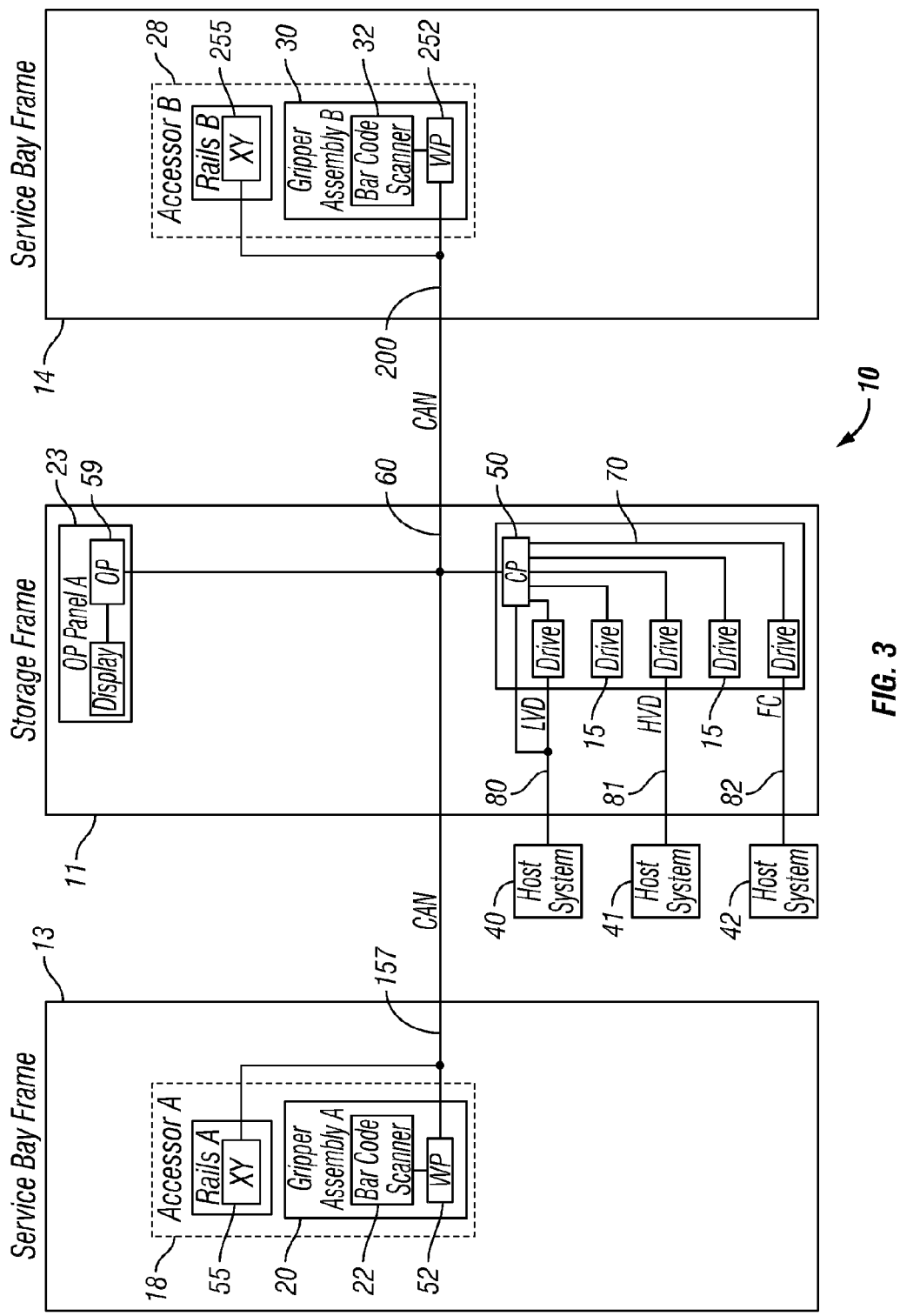
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be SCSI busses. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as SCSI, or a serial connection, such as RS-422. Thus the data storage drives 15 may be individually coupled to the communication processor node 50 by means of lines 70. Alternatively, the data storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. Essentially, the term "library controller" as used herein is intended in its broadest sense as a device that contains at least one computer processor, as such term is defined herein.

Figure 4:
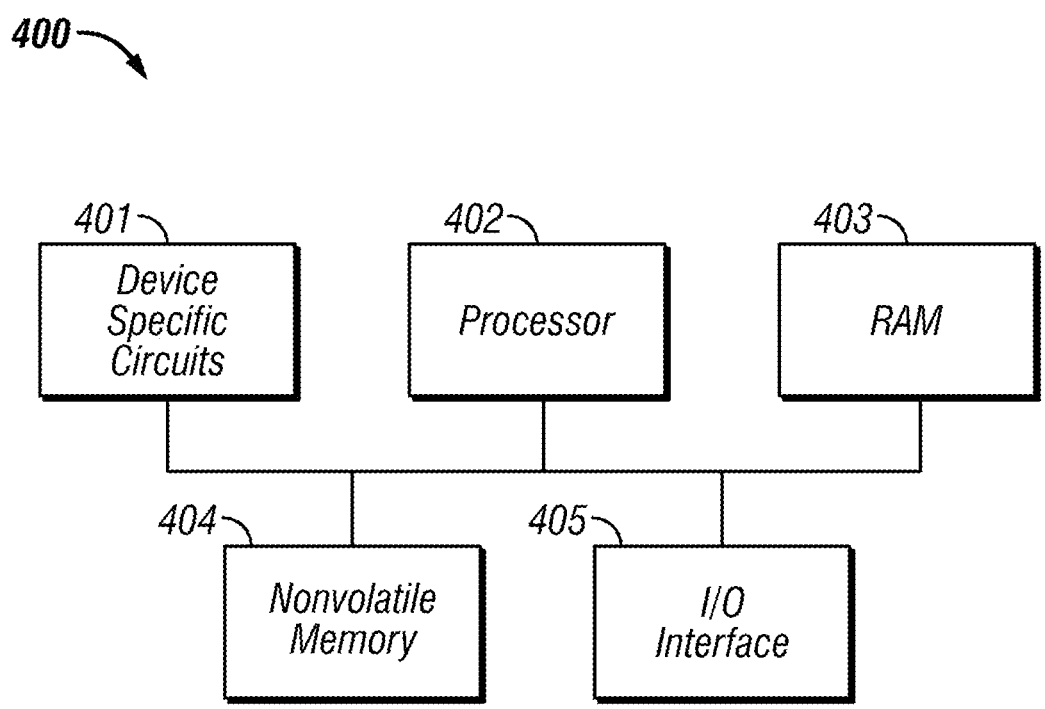
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
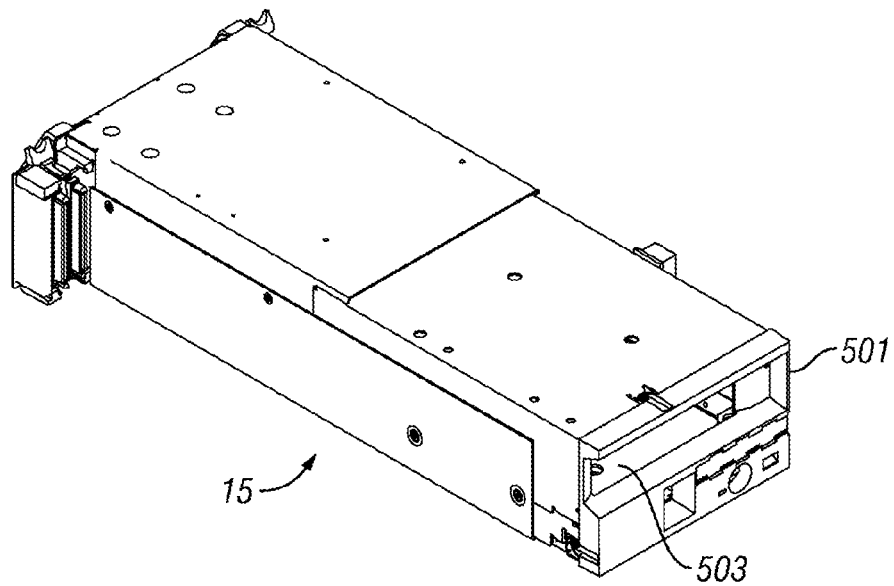
FIG. 5A is a frontal perspective view of a data storage drive according to one embodiment.
Figure 5B:
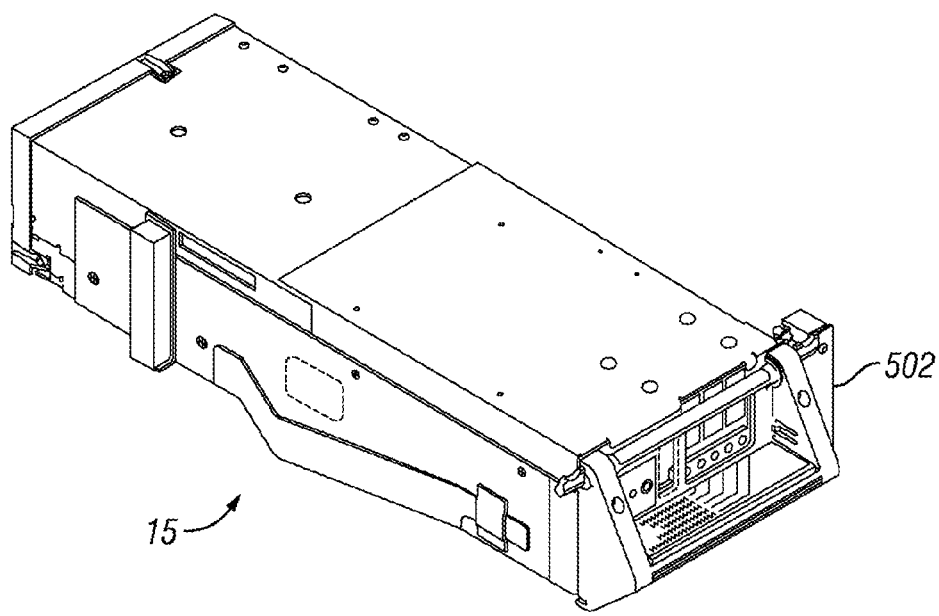
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
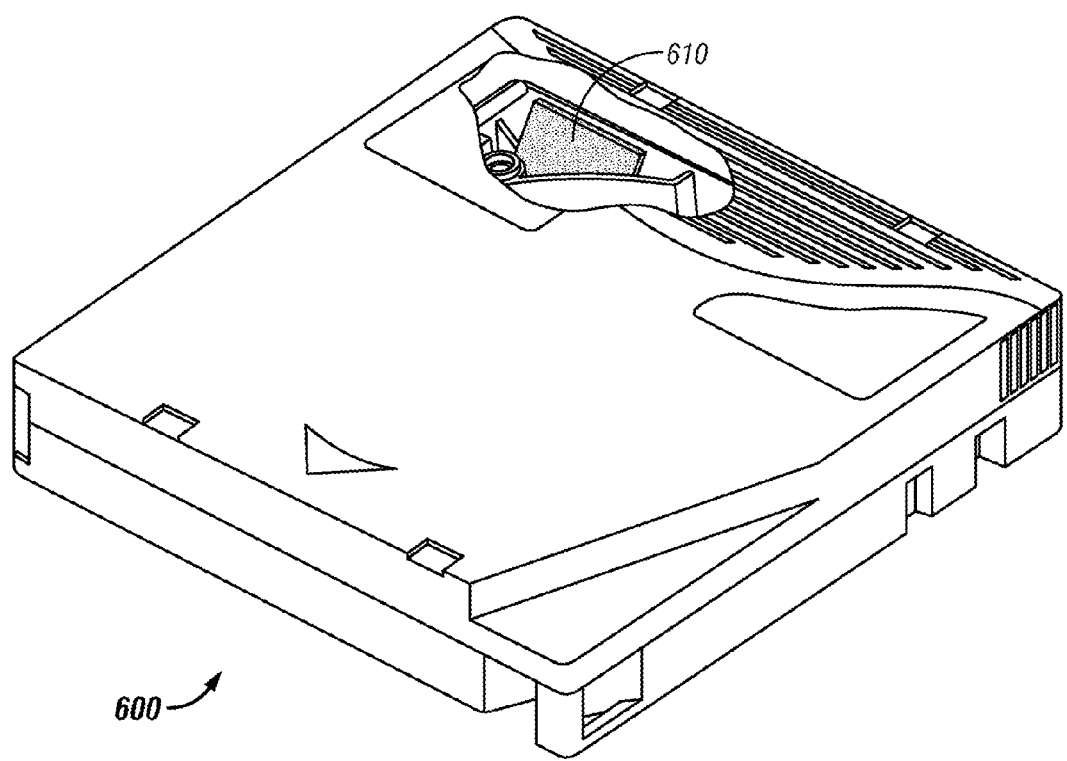
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
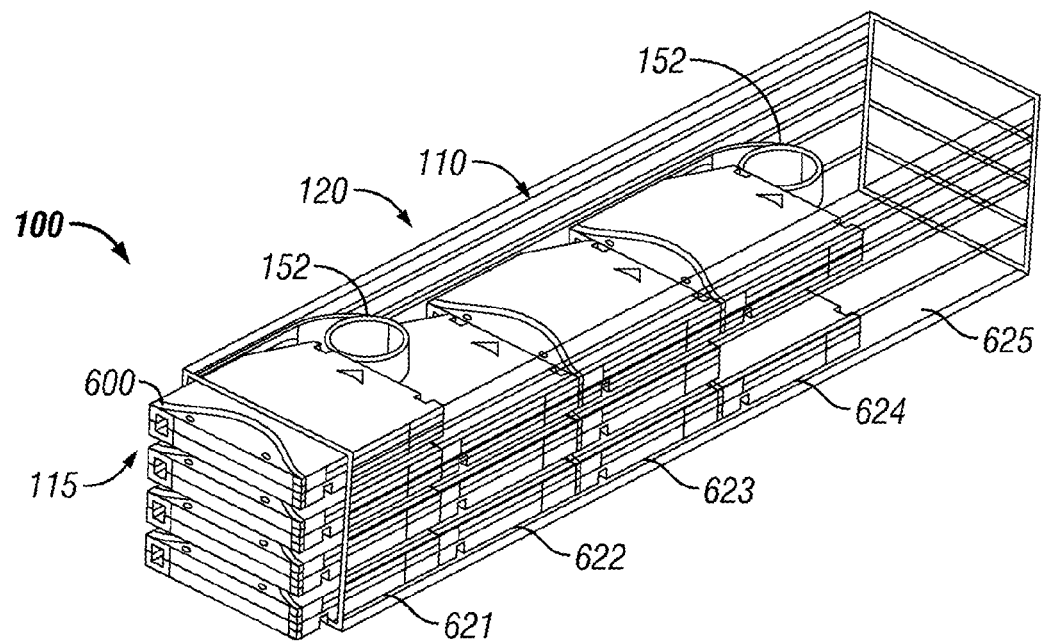
FIGS. 7A-7B are perspective views of a multi-cartridge deep slot cell according to one embodiment.
Figure 7B:
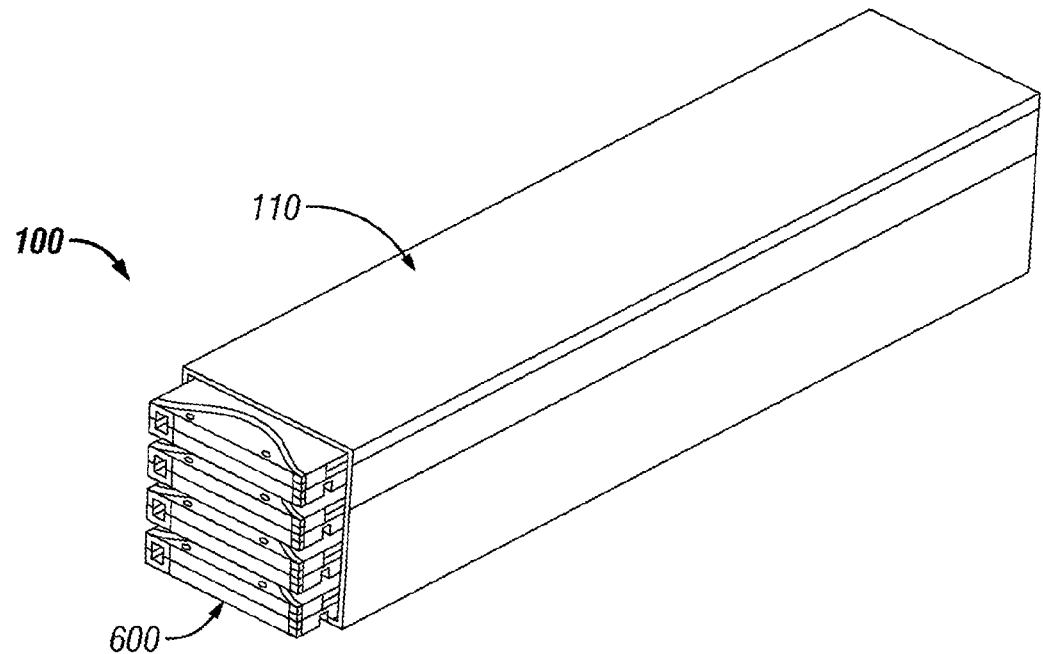

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
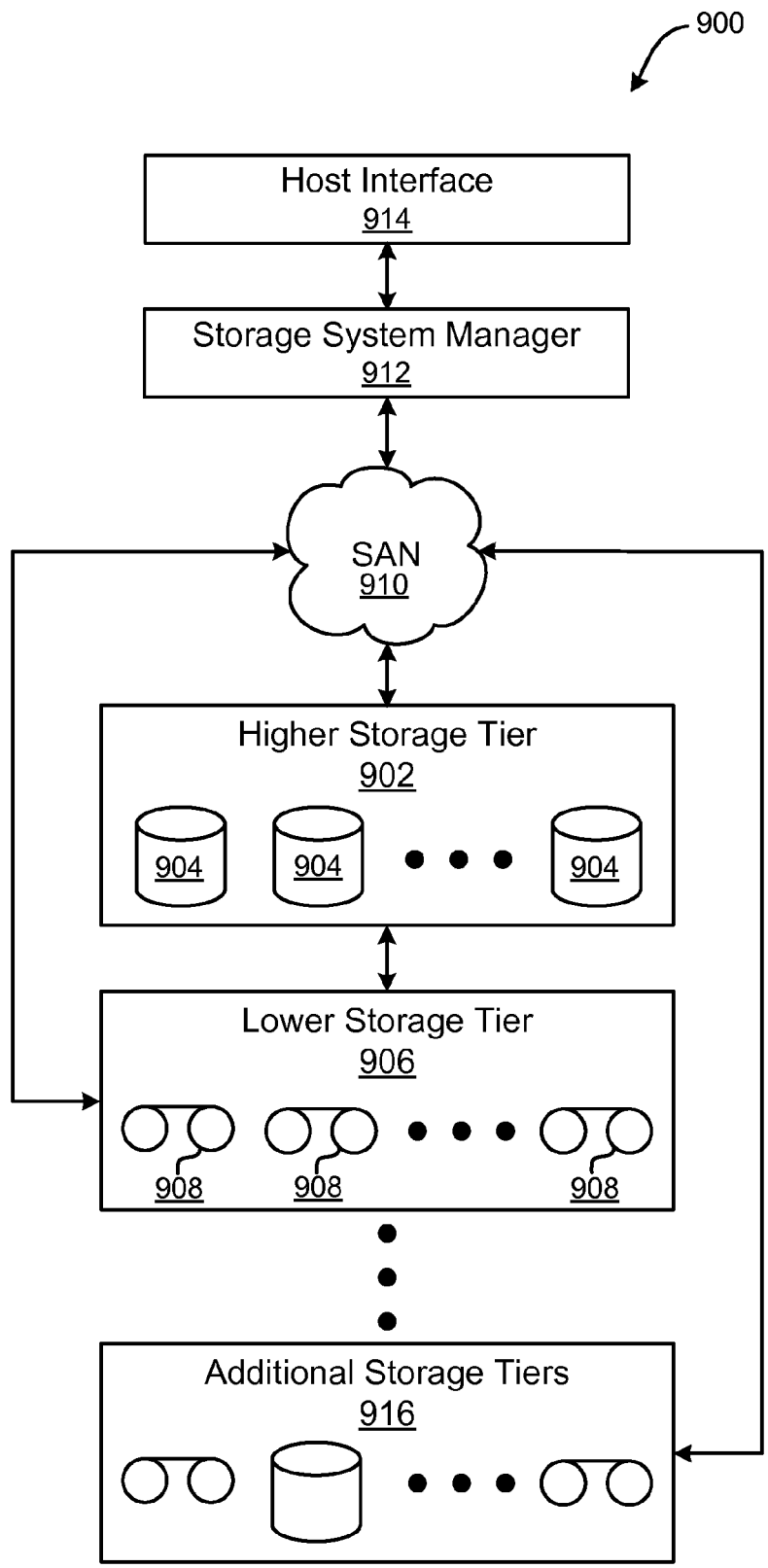
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

With continued reference to the data systems described above, it should be noted that the operating performance of components of storage systems, e.g. tape drives, tiers, etc., is dependent on a number of parameters. It should be noted that conventional backup and archiving solutions are sometimes plagued by slow performance when writing small files e.g. small text files, log files, small data files, etc. to tape while large files e.g. large picture files, seismic data files, large backup files, etc., may stream relatively faster. Using a tape-based data storage system as an example, this problem is in part due to each tape drive generation typically having its own streaming speeds, e.g., generation one could have a streaming speed of 100 megabytes/sec (MB/s), generation two could have a streaming speed of 200 MB/s, generation three could have a streaming speed of 300 MB/s, etc. Issues which contribute to the slow performance of a drive may include, for example, overhead processing, scalability, etc. and may be further exacerbated by a large number of smaller files in a writing job queue.

Embodiments described herein utilize job queue placement prioritization in order to increase drive performance and traverse the problems described above.

Figure 10:
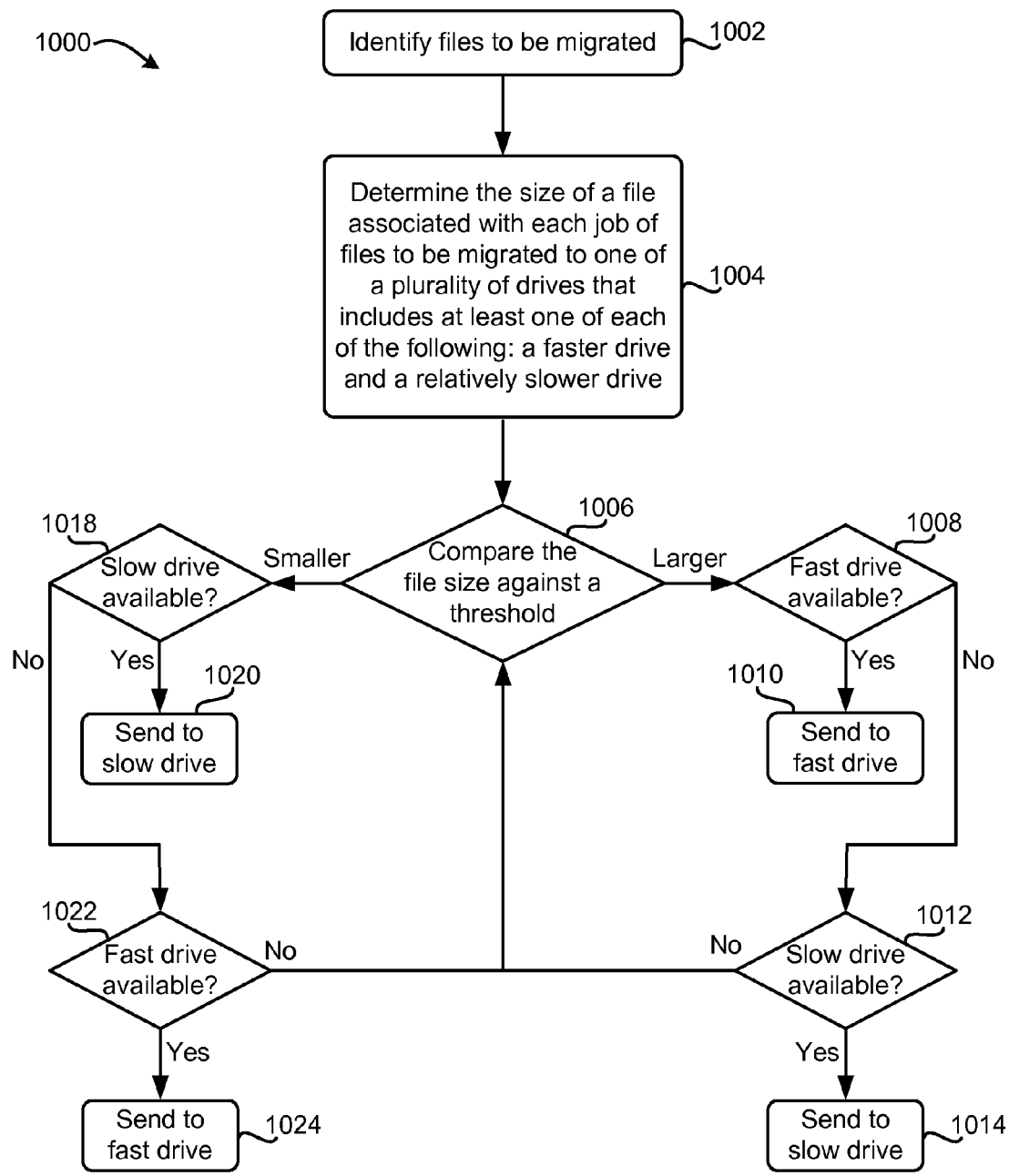
FIG. 10 illustrates a process according to one embodiment.

Now referring to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a tape library as in FIG. 1, a tiered storage system as in FIG. 9, or some other device having one or more controllers therein. The controllers, e.g., processing circuit(s), chip(s), and/or module(s) implemented in hardware and/or software, and preferably having at least one hardware component may be utilized in any device to perform one or more steps of the method 1000. Illustrative controllers include, but are not limited to, a central processing unit (CPU), an application specific integrated circuit (ASIC), a field programmable gate array (FPGA), etc., combinations thereof, or any other suitable computing device known in the art.

Referring now to FIG. 10, a method 1000 for prioritizing the assignment of jobs in a job queue is detailed according to one embodiment. In operation 1002, files that are to be migrated from one storage device to another are identified. Such files may be identified via write requests, from a list of files to migrate, etc. The write requests may come from one or more hosts, a storage area network controller, another storage device, etc.

In operation 1004, the files, or indicators thereof, to be migrated from one data storage device to one of a plurality of drives, e.g., between tiers of a tiered data storage system, are placed in a job queue as "jobs." For example, such indicator may be a file name, a full path filename, a pointer, etc. The plurality of drives includes at least one faster drive and at least one relatively slower drive (relative to a faster drive). The various drives may be pre-designated as faster and slower drives, e.g., based on their relative expected and/or exhibited data processing rates.

Furthermore, in operation 1004, the size of a file associated with each job may be determined using any technique known in the art. For example, file size metadata associated with each file can be examined.

This size determination may be used to prioritize the placement of jobs to drives (as will be described herein) in order to e.g. maintain a high drive performance, prevent bottlenecking in a drive, maintain efficient drive streaming, etc. As noted in decision 1006, the determined sizes of files in each job (e.g. by operation 1004) are compared against a threshold. The threshold may be determined by a processor, computed by statistical calculations based on values of past write performances, received from a user, etc. In another approach, the threshold may be predefined e.g., by a user, by being hardcoded into firmware, by statistical values of past job writes, etc. Additionally, the threshold may be dynamically adjusted based on file sizes of jobs in the job queue and/or other criteria such as calculated statistical values, drive performance during previous write durations, etc.

Based on the threshold comparison of decision 1006, a job in the job queue associated with a file size larger than the set threshold may be selected for writing out to a faster drive e.g., where a faster drive may have a relatively faster write rate (as determined from drive spec, from past performance, etc.) than other drives in the system having a relatively slower write rate as indicated in the system, may be on a predefined list of drives indicated as faster drives, may be faster than another available drive as determined on the fly, etc.

It should be noted that the faster drives according to one embodiment may be tape drives. According to another embodiment, the faster and slower drives may be tape drives. According to yet another embodiment, the slower drives may be tape drives e.g. as noted by lower storage tiers 906 of FIG. 9. Furthermore, the assignment of faster and/or slower drive types of embodiments described herein may vary. For example, in method 1000 the faster drives may initially be tape drives while the slower drives are disk drives, but after performing a certain number of operations e.g. three file writes, four file writes, five file writes, etc., the faster and slower drives may both be tape drives.

Once the job in the job queue having a file size larger than the set threshold is selected for writing out to a faster drive e.g. as noted by logic path "Larger" of decision 1006, the availability of a faster drive to process the job, e.g., by storing the file associated therewith to a storage medium, is determined as noted in decision 1008. When a faster drive is available for processing the job having a file size larger than the set threshold e.g. as noted by logic path "Yes" of decision 1008, the file associated with the job is sent to the faster drive for writing as noted by operation 1010.

Similarly, based on the a file size being smaller than the threshold as determined by threshold comparison of decision 1006, a job in the job queue having a file size smaller than the set threshold may be selected for writing out to a slower drive e.g., where a slower drive may have a relatively slower write rate (as determined from drive specifications, from past performance, etc.) than other drives in the system having a relatively faster write rate as indicated in the system, may be on a predefined list of drives indicated as slower drives, may be slower than another available drive as determined on the fly, etc.

Once the job in the job queue having a file size smaller than the set threshold is selected for writing out to a slower drive e.g. as noted by logic path "Smaller" of decision 1006, the availability of a slower drive to process the job is determined as noted by decision 1018. When a slower drive is available e.g. as noted by logic path "Yes" of decision 1018, for writing the file having a file size smaller than the set threshold, the file associated with the job is sent to the slower drive for writing as noted in operation 1020.

It should be noted that multiple jobs in the job queue having file sizes smaller than the threshold may be batched together and the files associated therewith sent to slower drive(s) for writing. Furthermore, multiple jobs in the job queue having file sizes larger than the threshold may be batched together and the files associated therewith sent to faster drive(s) for writing. For example, instead of sending ten small files for writing to any available slow drive(s) in ten separate assignments, a controller may batch together the ten small files for writing to any available slow drive(s) and assign the ten small files in a single assignment to the slow drive(s). Batching together multiple smaller files for drive writing is advantageous, especially in minimizing overhead.

In one example, e.g., in a tiered storage system environment such as that shown in FIG. 9, disk space in a higher tier may be freed up by migrating stale data to tape in a lower tier. Particularly, one large file may free up much more space than several much smaller files. Ideally, the larger files may be migrated first to free up the most space. Accordingly, in one approach, migration may be modified to occur out of order of the job queue such that once a faster drive becomes available, a larger file is migrated. Once this initial large file is done, another large file to migrate may be sought, even though it is not next in the job queue and/or is smaller than the threshold, to continue emptying the disk cache as quickly as possible by transferring the second large file to the fast drive. In other words, the fast drive may be used to migrate all of the larger files first before switching to small file migration. Thus, after a larger file, e.g., having a file size larger than the threshold, is sent to the faster drive, another job in the job queue may be selected out of an order of the jobs in the job queue for processing by the faster drive.

In another approach, several jobs in the job queue associated with files having file sizes larger than the threshold may be batched together for writing out to the faster drive, even though the jobs are not consecutive in the job queue, i.e., the jobs may be batched and processed out of order. This maximizes the amount of data that can be migrated in the fastest manner.

In a further approach, after a batch of large files is migrated, larger ones of the small files may be migrated to the fast drive instead of migrating the job(s) listed next in the queue. This also increases the amount of data that can be migrated in a fast manner.

Selecting the determined larger size files (e.g. where the determination is made by comparing the file size to the threshold) for writing out to a faster drive, while selecting the determined smaller size files (e.g. where the determination is made by comparing the file size to the threshold) for writing out to a slower drive is performed in order to maintain a high drive performance. This is because drives, especially tape drives, have been found to perform more optimally when large files are written out to faster drives and small files are written out to slower drives e.g. when both faster and slower drives are available.

With continued reference to method 1000, further method operations (which will now be described below) may be implemented when e.g. a fast drive is not available for a larger file and/or a slow drive is not available for a smaller file.

When it is determined that a faster drive is not available for writing a job having a file size larger than the set threshold e.g. as noted by logic path "No" of decision 1008, the availability of a slower drive to process the job is determined e.g. as noted by decision 1012. If a slower drive is available for writing e.g. as noted by logic path "Yes" of decision 1012, the file associated with the job is sent to the slower drive for writing in operation 1014.

If a slower drive is not available for writing e.g. as noted by logic path "No" of decision 1012, the job may maintain a preference of being written to a faster drive, and again follows the "Larger" logic path of decision 1006 e.g. immediately, after waiting in a queue for an available drive, after new jobs with a higher priority are written to a drive that becomes available, etc.

On the other hand, if it is determined that the threshold e.g. threshold of decision 1006, has not changed e.g. as noted by logic path "No" of decision 1016, the job maintains a preference of being written to a fast drive, and again follows the "Larger" logic path of decision 1006.

Moreover, when it is determined that a slower drive is not available for writing a job having a file size smaller than the set threshold e.g. as noted by logic path "No" of decision 1018, the availability of a faster drive to write the job is determined e.g. as noted by decision 1022. If a faster drive is available for writing e.g. as noted by logic path "Yes" of decision 1022, the file associated with the job is sent to the faster drive for writing in operation 1024. If a faster drive is not available for writing the job may maintain a preference of being written to a slow drive, and again follows the "Smaller" logic path of decision 1006 e.g. immediately, after waiting in a queue for an available drive, after new jobs with a higher priority are written to a drive that becomes available, etc.

It should be noted that when neither a fast drive nor a slow drive is available for writing a file, a drive status may be e.g. created, maintained, monitored, etc. in order to alert the e.g. controller when a drive becomes available for writing. Moreover, if a user wishes to override a preference of the logic of method 1000, the priority of the job queue, threshold parameters, etc. they may do so. Furthermore, the user may reset these parameters back to defaults at any time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   determining a size of a file associated with each job in a job queue of files to be migrated to one of a plurality of drives that includes at least one of each of the following: a faster drive and a relatively slower drive;
   determining availability of a faster drive; and
   sending a file associated with a job in the job queue having a file size larger than a threshold to the faster drive,
   wherein the faster drive has a faster write rate than the relatively slower drive as determined from at least one characteristic selected from a group consisting of drive specifications of the faster and relatively slower drives and past performance of the faster and relatively slower drives,
   wherein the faster drive is a solid state drive and the relatively slower drive is a tape drive.

2. A method as recited in claim 1, comprising determining availability of a slower drive when a faster drive is not available; and sending the job to the slower drive when the slower drive is available.

3. A method as recited in claim 1, wherein the threshold is dynamically adjusted based on file sizes of files associated with jobs in the job queue.

4. A method as recited in claim 1, comprising:
selecting a second job in the job queue associated with a file having a file size smaller than the threshold for writing out to a slower drive;
determining availability of a slower drive to write the second job;
sending the file associated with the second job to the slower drive when the slower drive is available;
determining availability of a faster drive when a slower drive is not available; and
sending the file associated with the second job to the faster drive when the faster drive is available.

5. A method as recited in claim 4, comprising batching together multiple jobs in the job queue associated with files having file sizes smaller than the threshold, and sending the multiple jobs to the slower drive for writing.

6. A method as recited in claim 1, comprising:
after sending the file associated with the job to the faster drive, selecting another job in the job queue out of an order of jobs in the job queue for writing to the faster drive, the another job being associated with a job having a larger file size than the threshold.

7. A method as recited in claim 1, wherein several jobs in the job queue associated with files having file sizes larger than the threshold are batched together for writing out the files associated therewith to the faster drive.

8. A method as recited in claim 7, wherein the several jobs are not consecutive in the job queue.

9. A system, comprising:
a controller implemented in hardware; and
logic integrated with and/or executable by the controller to perform the method as recited in claim 1.

10. A method, comprising:
determining a size of a file associated with each job in a job queue of files to be migrated to one of a plurality of drives that includes at least one of each of the following: a faster drive and a relatively slower drive;
determining availability of the slower drive; and
sending a file associated with a job in the job queue having a file size smaller than a threshold to the slower drive,
wherein the faster drive has a faster write rate than the relatively slower drive as determined from at least one characteristic selected from a group consisting of drive specifications of the faster and relatively slower drives and past performance of the faster and relatively slower drives,
wherein the faster drive is a solid state drive and the relatively slower drive is a tape drive.

11. A method as recited in claim 10, comprising determining availability of a faster drive to process the job when a slower drive is not available; and sending the file associated with the job to the faster drive when the faster drive is available.

12. A method as recited in claim 10, wherein the threshold is dynamically adjusted based on file sizes of files associated with jobs in the job queue.

13. A method as recited in claim 10, wherein the slower drive is a tape drive.

14. A method as recited in claim 10, comprising batching together multiple jobs in the job queue associated with files having file sizes smaller than the threshold, and sending the files associated with the multiple jobs to the slower drive for writing.

15. A system, comprising:
a controller implemented in hardware; and
logic integrated with and/or executable by the controller to perform the method as recited in claim 10.

16. A computer program product for selecting a drive based on file size, the computer program product comprising a computer readable storage medium having program instructions embodied therewith, the program instructions executable by a controller to cause the controller to:
determine, by the controller, a size of a file associated with each job in a job queue;
determine, by the controller, availability of a faster drive;
send, by the controller, a file associated with a job in the job queue associated with a file having a file size larger than a threshold to the faster drive;
determine, by the controller, availability of a relatively slower drive having a write rate that is slower than the faster drive as determined from specifications of each drive, wherein the faster drive is a solid state drive and the relatively slower drive is a tape drive; and
send, by the controller, a file associated with a job in the job queue having a file size smaller than the threshold to the slower drive; and
send, by the controller, the file associated with a second of the jobs to the slower drive when the slower drive is available.

* * * * *